(12) United States Patent
Robinson

(10) Patent No.: US 7,837,064 B1
(45) Date of Patent: Nov. 23, 2010

(54) FLUID DISPENSING DEVICE

(75) Inventor: Philip J. Robinson, Sylvania, OH (US)

(73) Assignee: Rexam Closure Systems Inc., Perrysburg, OH (US)

( * ) Notice: Subject to any disclaimer, the term of this patent is extended or adjusted under 35 U.S.C. 154(b) by 668 days.

(21) Appl. No.: 11/881,971

(22) Filed: Jul. 30, 2007

(51) Int. Cl.
*B67D 7/22* (2010.01)

(52) U.S. Cl. ............... 222/49; 222/153.01; 222/153.13; 222/321.9

(58) Field of Classification Search ............... 22/153.13, 22/309, 320, 321.1, 321.3, 321.7, 321.9, 22/383.3, 384, 49, 153.01

See application file for complete search history.

(56) References Cited

U.S. PATENT DOCUMENTS

| | | | | |
|---|---|---|---|---|
| 1,057,982 | A * | 4/1913 | Rachmann | 239/333 |
| 2,519,640 | A | 8/1950 | Echols, Sr. et al. | |
| 3,556,353 | A * | 1/1971 | Echols | 222/309 |
| 4,081,111 | A * | 3/1978 | Sandow | 222/309 |
| 4,364,388 | A | 12/1982 | Cech | |
| 5,381,932 | A | 1/1995 | Humphrey | |
| 5,579,957 | A * | 12/1996 | Gentile et al. | 222/153.14 |
| 5,746,349 | A | 5/1998 | Putteman et al. | |
| 5,950,690 | A * | 9/1999 | Seidler | 141/23 |
| 6,112,779 | A | 9/2000 | Camilla | |
| 6,209,761 | B1 * | 4/2001 | Bonningue | 222/321.7 |
| 6,250,504 | B1 | 6/2001 | Maffei | |
| 6,257,458 | B1 | 7/2001 | Green | |
| 6,443,331 | B1 * | 9/2002 | DeJonge | 222/153.13 |
| 6,675,845 | B2 | 1/2004 | Volpenheim et al. | |
| 6,726,064 | B2 * | 4/2004 | Bonningue | 222/321.9 |
| 6,866,167 | B2 * | 3/2005 | Bougamont | 222/321.7 |
| 2005/0023285 | A1 | 2/2005 | Keung | |

* cited by examiner

*Primary Examiner*—Kevin P Shaver
*Assistant Examiner*—Daniel R Shearer
(74) *Attorney, Agent, or Firm*—Reising Ethington PC

(57) ABSTRACT

A fluid dispensing device includes a barrel having a hollow interior, an inlet opening at one end and an open second end. A plunger is slidably received within the hollow interior of the barrel through the open second end and has an outlet passage extending through its length to an outlet outside of the barrel. An inlet valve is disposed at the inlet opening of the barrel and an outlet valve is carried within the outlet passage of the plunger. A closure is secured to the barrel over the open end of the barrel and over the plunger, with the closure urging the plunger into the barrel against the inlet valve such that the plunger engages the inlet valve and holds the inlet valve closed. Opening of the closure permits the plunger to be withdrawn from the barrel to draw fluid into the barrel through the inlet opening and the inlet valve. Return of the plunger into the barrel closes the inlet valve and forces the fluid in the barrel through the outlet passage and the outlet valve in the plunger.

13 Claims, 2 Drawing Sheets

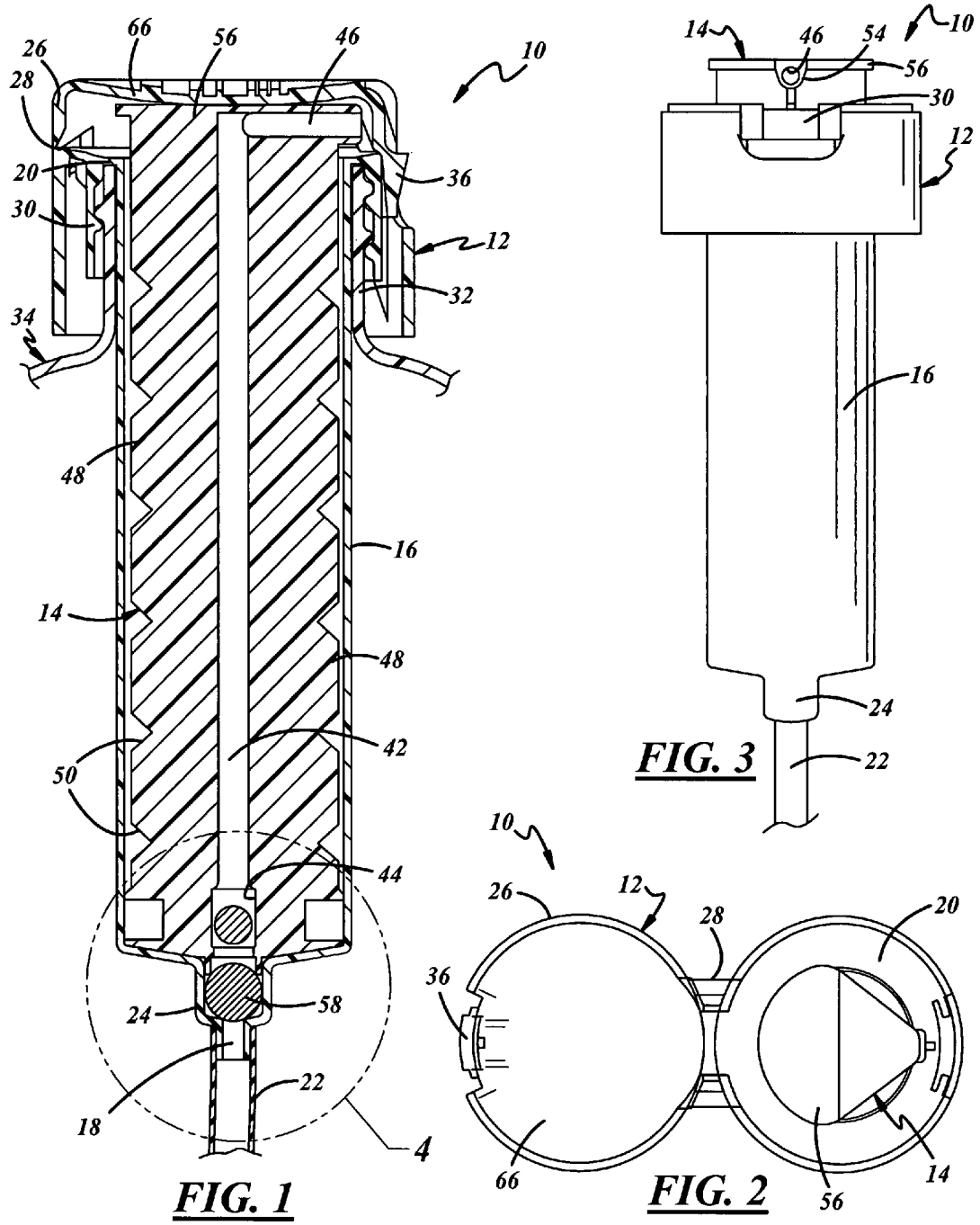

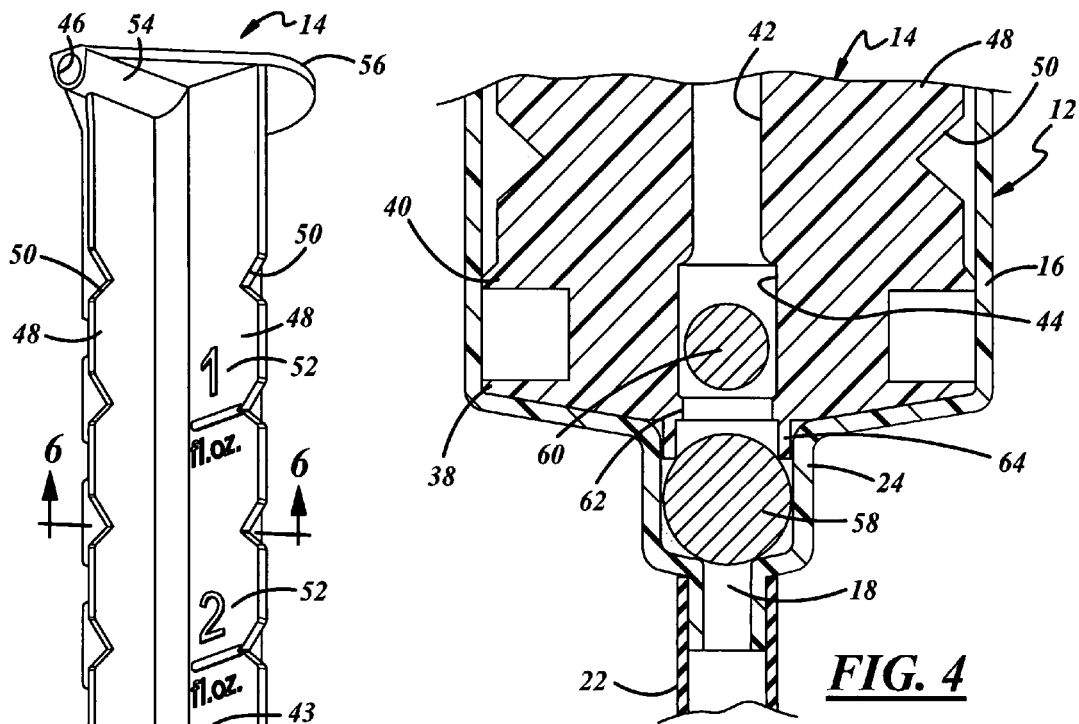
*FIG. 4*
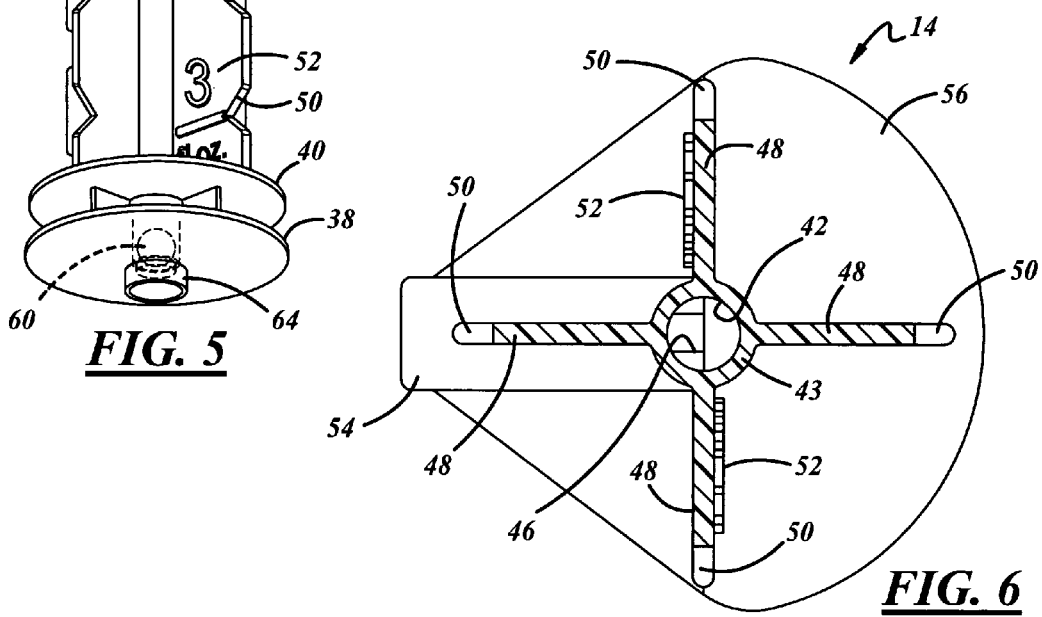
*FIG. 5*
*FIG. 6*

FLUID DISPENSING DEVICE

The present disclosure relates to a fluid dispensing device that includes a plunger slidably disposed within a barrel and having valves to draw fluid into the barrel as the plunger is withdrawn from the barrel and discharge fluid through the plunger as the plunger is moved back into the barrel.

BACKGROUND AND SUMMARY OF THE DISCLOSURE

The present disclosure embodies a number of aspects that can be implemented separately from or in combination with each other.

A fluid dispensing device in accordance with one aspect of the present disclosure includes a barrel having a hollow interior, an inlet opening at one end and an open second end. A plunger is slidably received within the hollow interior of the barrel through the open second end and has an outlet passage extending through its length to an outlet outside of the barrel. An inlet valve is disposed at the inlet opening of the barrel and an outlet valve is carried within the outlet passage of the plunger. A closure is secured to the barrel over the open end of the barrel and over the plunger, with the closure urging the plunger into the barrel against the inlet valve such that the plunger engages the inlet valve and holds the inlet valve closed. Opening of the closure permits the plunger to be withdrawn from the barrel to draw fluid into the barrel through the inlet opening and the inlet valve. Return of the plunger into the barrel closes the inlet valve and forces the fluid in the barrel through the outlet passage and the outlet valve in the plunger. The closure preferably is of one-piece plastic construction with the barrel and is connected to the barrel by an integral hinge that permits the closure to be pivoted between a closed position urging the plunger against the inlet valve and an open position spaced from the plunger. A child-resistant latch preferably is provided between the closure and the barrel, and preferably is of integrally molded plastic construction with the closure and the barrel.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a sectional view of a fluid dispensing device in accordance with an exemplary embodiment of the present disclosure;

FIG. 2 is a top plan view of the device illustrated in FIG. 1;

FIG. 3 is a side elevational view of the device illustrated in FIGS. 1 and 2;

FIG. 4 is an enlarged sectional view of the portion of FIG. 1 within the area 4;

FIG. 5 is a perspective view of the plunger in the fluid dispensing device of FIGS. 1-4; and FIG. 6 is a sectional view taken substantially along the line 6-6 in FIG. 5.

DETAILED DESCRIPTION OF PREFERRED EMBODIMENTS

The drawings illustrate a fluid dispensing device 10 in accordance with an exemplary embodiment of the present disclosure as including a housing 12 within which a plunger 14 is slidably disposed. Housing 12 includes a cylindrical barrel 16 having a hollow interior, an inlet opening 18 at a first end and an open second end 20. A hollow tube 22 may extend from inlet 18 to facilitate drawing fluid from deep containers or the like. The hollow interior of barrel 16 connects with inlet opening 18 through a cylindrical pocket 24 that is integral with barrel 16. At the open end of barrel 16, a closure 26 is connected by means of a hinge 28. The hinge 28 illustrated in the drawings is of the type disclosed in U.S. Pat. No. 6,041,477, although any suitable hinge can be employed. A skirt 30 extends from open end 20 surrounding and spaced from the end of barrel 16. Skirt 30 has suitable internal means, such as internal beads or threads, for mounting device 10 to the neck finish 32 of a container 34 such that barrel 16 extends through neck finish 32 into the interior of the container. Housing 12 preferably includes a child-resistant latch 36 between closure lid 26 and the portion of the housing surrounding open end 20. The specific latch 36 illustrated in the drawings is of the type disclosed in U.S. Patent document 2005/0023285A1, although other suitable child-resistant latches can be employed. Housing 12, including barrel 16, inlet 18, open end 20, pocket 24, closure 26, hinge 28, skirt 30 and child-resistant latch 36, preferably is of one-piece integrally molded plastic construction such as polypropylene.

Plunger 14 preferably includes an elongated body having at least one seal flange 38, and preferably a pair of axially spaced seal flanges 38,40, for sliding receipt within the hollow interior of cylindrical barrel 16. An outlet passage 42 extends through a center tube 43 of plunger 14 from an enlarged pocket 44 at the lower end of plunger 14 to a lateral outlet 46 at the opposing end of plunger 14. Outlet passage tube 43 preferably forms the center or spine of plunger 14, from which one or more vanes 48 radially outwardly extend. In the illustrated exemplary embodiment, there are four vanes 48 spaced 90° from each other, as best seen in FIGS. 5 and 6. Vanes 48 preferably have notches 50 and/or suitable numeric indicia 52 spaced from each other lengthwise of the vanes and coordinated with the length of the plunger for metering intake into barrel 16 as will be described. Outlet 46 extends through a hollow tube 54 at an angle, preferably a right angle, to tube 43 and integrally connected to one of the vanes 48 as shown in FIGS. 5 and 6. An enlarged plunger head 56 facilitates manipulation of plunger 14 as will be described. Enlarged head 56 preferably is tapered toward the outlet end of tube 54. Outlet tube 54 preferably is integral with head 56, but could be spaced from head 56. Plunger 14 may be of any suitable construction, preferably plastic construction such as high density polyethylene. An inlet ball valve 58 is disposed within pocket 24 of barrel 16. An outlet ball valve 60 is disposed within pocket 44 of plunger 14 and captured within the plunger by an internal bead 62. Other types of outlet valves, such as a flapper valve, could be employed. Plunger 14 has a hollow cylindrical extension 64 that engages inlet ball valve 58 in the fully inserted position of the plunger to seal inlet ball valve 58, as will be described.

When closure 26 is fully closed over barrel end 20 and plunger 14 (FIG. 1), the base wall 66 of closure 26 engages head 56 of plunger 14 and resiliently holds plunger 14 in the position shown in FIGS. 1 and 4 engaging inlet ball valve 58 and sealing inlet opening 18. Opening of closure 26, preferably by manipulation of child-resistant latch 36, releases plunger 14 to be withdrawn from barrel 16. Sliding engagement between plunger flanges 38,40 and the inside surface of barrel 16 results in reduced pressure within barrel 16, opening inlet ball valve 58 and drawing fluid through inlet 18 into barrel 16. Notches 50 and/or indicia 52 on plunger 14 cooperate with open end 20 of barrel 16 to indicate the amount of fluid drawn into the barrel as a function of the amount that plunger 14 has been withdrawn from the barrel. When the desired amount of fluid has been drawn, plunger 14 can then be pushed into barrel 16 to discharge the fluid under pressure past outlet ball valve 60, through outlet passage 42 and outlet 46. The positive fluid pressure as the plunger is reinserted into the barrel moves outlet ball valve 60 off of the seat formed by bead 62 and permits the fluid to be discharged through outlet passage 42 to outlet 46. Tubing or the like can be connected to outlet 46 to route the fluid as desired. When the desired amount of fluid has been discharged, closure 26 can be returned to the closed and latched position.

A fluid dispensing device has been disclosed in conjunction with an exemplary embodiment, and various modifications and variations have been discussed. Other modifications and variations readily will suggest themselves to persons of ordinary skill in the art in view of the foregoing discussion. For example, flanges 38, 40 on plunger 14 could be replace by a rubber piston with one or more flanges that engage the inside surface of the barrel. The rubber piston could have a center opening received over the end of tube 43. As another alternative, outlet valve 60 could be disposed within the rubber piston. The disclosure is intended to embrace all such modifications and variations as fall within the spirit and broad scope of the appended claims.

The invention claimed is:

1. A fluid dispensing device that includes:
a barrel having a hollow interior, an inlet opening at one end and an open second end,
an inlet valve at said inlet opening of said barrel,
a plunger slidably received within said hollow interior of said barrel through said open second end, said plunger including a head external to said barrel to facilitate manipulation of said plunger, said plunger having an outlet passage extending through its length to an outlet outside of said barrel,
an outlet valve within said outlet passage of said plunger,
a skirt surrounding said second end of said barrel with internal means for securing said barrel within a container neck finish,
a closure lid including a base wall and being integrally hinged to said barrel at said open second end by an integral hinge that permits said closure lid to be pivoted from a closed position wherein said base wall engages said plunger head to resiliently urge said plunger into said barrel against said inlet valve such that said plunger engages said inlet valve and holds said inlet valve closed, to an open position spaced from said plunger to release said plunger, and
a child-resistant latch opposite said integral hinge between said closure lid and said skirt,
opening of said closure lid permitting said plunger to be withdrawn from said barrel to draw fluid into said barrel through said inlet opening and said inlet valve, return of said plunger into said barrel closing said inlet valve and forcing fluid from within said barrel through said outlet passage and said outlet valve,
wherein said barrel, said closure lid, said integral hinge, said skirt, and said child-resistant latch are of one-piece integrally molded plastic construction.

2. The device set forth in claim 1 wherein said inlet valve comprises a ball captured within said barrel at said inlet opening at said one end of said barrel.

3. The device set forth in claim 2 including an inlet tube extending from said inlet opening of said barrel.

4. The device set forth in claim 1 wherein said outlet valve is disposed at an end of said plunger adjacent to said inlet valve.

5. The device set forth in claim 4 wherein said outlet valve comprises a ball captured in said outlet passage of said plunger.

6. The device set forth in claim 5 wherein said plunger includes an enlarged head external to said barrel to facilitate manipulation of said plunger, and wherein said outlet passage extends laterally through said head to said outlet.

7. The device set forth in claim 6 wherein said enlarged head is tapered toward said outlet.

8. A fluid dispensing device that includes:
a housing of one-piece integrally molded plastic construction including a cylindrical barrel having a hollow interior, an inlet opening at one end and an open second end, a closure lid including a base wall and being hinged to said barrel at said open second end, and a skirt surrounding said barrel adjacent to said open second end with internal means for securing said housing to a container neck finish,
an inlet valve carried by said barrel at said inlet opening of said barrel, and
a plunger slidably received within said hollow interior of said barrel through said open second end, said plunger including a head external to said barrel to facilitate manipulation of said plunger, a center tube, a plurality of vanes extending outwardly from said center tube and having graduations along its length for metering intake into said barrel, and an outlet tube integrally connected to one of the vanes and the head, and wherein the center tube has an outlet passage extending through its length from an enlarged pocket at a lower end of said plunger to a lateral outlet outside of said barrel extending through the lateral tube and the head at an opposing end of said plunger, and
an outlet valve carried by said plunger within said outlet passage at an end of said outlet passage adjacent to said inlet valve,
an integral hinge hinging said closure lid to said barrel at said open second end thereof to permit said closure lid to be pivoted from a closed position over said open second end of said barrel and said plunger wherein said base wall of said closure lid engages said plunger head to resiliently urge urging said plunger against said inlet valve such that said plunger engages said inlet valve and holds said inlet valve closed, to an open position spaced from said plunger to release said plunger, and
a child-resistant latch opposite said integral hinge between said closure lid and said skirt,
opening of said closure lid permitting said plunger to be withdrawn from said barrel to draw fluid into said barrel through said inlet opening and said inlet valve, return of said plunger into said barrel closing said inlet valve and forcing fluid from within said barrel through said outlet passage and said outlet valve,
wherein said barrel, said closure lid, said integral hinge, said skirt, and said child-resistant latch are of one-piece integrally molded plastic construction.

9. The device set forth in claim 8 wherein said inlet valve comprises a ball captured in said barrel at said inlet opening.

10. The device set forth in claim 9 including an inlet tube extending from said inlet opening of said barrel.

11. The device set forth in claim 10 wherein said outlet valve includes a ball captured in said outlet passage of said plunger.

12. The device set forth in claim 11 wherein said outlet passage extends laterally through said head to said outlet.

13. The device set forth in claim 12 wherein said head is tapered toward said outlet.

* * * * *